H. C. MONTGOMERY.
Improvement in Stop-Cocks.
No. 132,308. Patented Oct. 15, 1872.
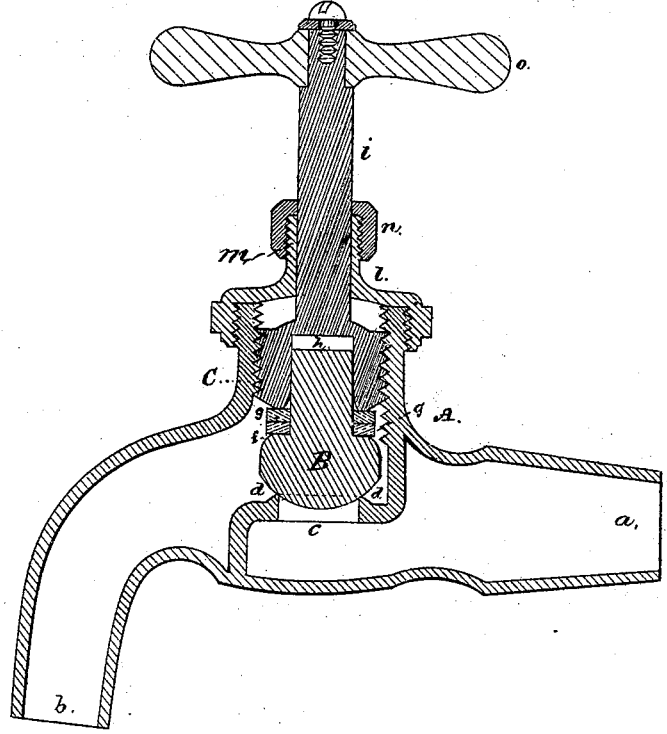
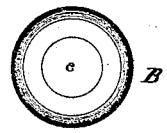
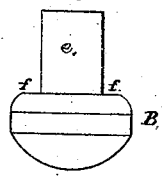
Witnesses.
Geo Stone
H. C. Hale
Harry C. Montgomery
by his attorney
F. P. Hale.

UNITED STATES PATENT OFFICE.

HARRY C. MONTGOMERY, OF BOSTON, MASSACHUSETTS.

IMPROVEMENT IN STOP-COCKS.

Specification forming part of Letters Patent No. 132,308, dated October 15, 1872.

*To all whom it may concern:*

Be it known that I, HARRY C. MONTGOMERY, of Boston, in the county of Suffolk and State of Massachusetts, have invented an Improved Stop-Cock; and do hereby declare the same to be fully described in the following specification and represented in the accompanying drawing, in which—

Fig. 1 denotes a central vertical and longitudinal section of a faucet or cock as constructed in accordance with my invention. Fig. 2 is a top view of the valve-plug; and Fig. 3, a side elevation thereof.

The object of my invention is to furnish a simple, cheap, and reliable faucet for water, steam, gas, &c.; and my invention consists in the peculiar construction of the plug, as hereinafter set forth and claimed, whereby the same is rendered anti-corrosive, easily operated, and little liable to get out of order.

In the said drawing, A denotes the body of the faucet, which is of the ordinary form, and provided with induction and eduction passages $a$ $b$. $c$ is the valve-opening, and $d$ $d$ the valve-seat disposed around the said opening. B is the valve-plug, which I make of glass, molded into the shape as shown in the drawing, the lower part being of a curved or hemispherical form, while its upper end terminates in a cylindrical stem or tenon, $e$. The said plug is also provided with an annular shoulder, $f$, to receive one or more elastic washers, $g$, which may be made of India rubber or other suitable material, the same being disposed around the stem or tenon $e$, and resting upon the shoulder $f$. The tenon $e$ extends up into a socket, $h$, formed in the lower face of the key C, whose spindle $i$ extends up through a guide tube or cap, $l$, which is screwed upon the neck $m$, and also extends through the cap $n$, which surmounts and is screwed upon the guide tube or cap $l$. $o$ is a handle affixed to the upper end of the spindle $i$ by turning which the key C may be rotated. One or both of the caps $l$ and $n$ may be provided with packing in the ordinary manner. By this construction the stuffing boxes or caps $l$ and $n$ may be packed while the faucet is under pressure. The said key C has a male screw cut upon its periphery, and works within a female screw made in the inner surface of the guide $l$, as shown in the drawing.

From the above it will be seen that in the operation of the faucet the raising of the plug from its seat is not effected by the key, but by the pressure of the fluid, and the closing of the plug upon its seat is accomplished by rotating the spindle of the key in the proper direction. The lower end of the key resting upon the elastic washers, as such key is turned downward the plug is forced home firmly upon its seat. The object of the washer or washers is not only to cause the plug to bear equably upon all parts of its seat, but to prevent any undue pressure exerted by the key from so impinging against the plug as to crush or injure the same. The tenon of the plug is formed of a diameter somewhat less than that of the socket in the key, in order to allow the tenon to play loosely therein, so as to allow the plug to accommodate it to its seat and permit the key to be rotated without producing any rotation of the plug. It will also be seen that by forming the plug of glass and with its lower end of a curved or hemispherical shape, I produce a plug which will retain its normal condition under all ordinary circumstances, being alike unaffected by heat or cold, the corrosive action of the fluid, or the wear incident to most if not all other valves; and, besides, once being fitted, it requires no regrinding as practically no injurious wear thereof takes place.

Having described my invention, what I claim in the above-described faucet, is—

The glass plug B, in combination with the key C, washers or packing $g$, arranged to operate together in stop valves or cocks, substantially as described, and for the purpose set forth.

HARRY C. MONTGOMERY.

Witnesses:
F. P. HALE,
F. C. HALE.